US007024158B2

(12) United States Patent
Wiswell

(10) Patent No.: US 7,024,158 B2
(45) Date of Patent: Apr. 4, 2006

(54) BROADBAND COMMUNICATION SATELLITE

(75) Inventor: Eric R. Wiswell, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 380 days.

(21) Appl. No.: 10/132,541

(22) Filed: Apr. 25, 2002

(65) Prior Publication Data

US 2003/0203718 A1 Oct. 30, 2003

(51) Int. Cl.
*H04B 7/185* (2006.01)

(52) U.S. Cl. ...................... 455/12.1; 455/13.3; 455/17; 370/418; 348/726

(58) Field of Classification Search ............... 455/12.1, 455/427, 13.1, 13.3, 17, 18, 20, 22, 428; 343/781, 755, 915; 370/418; 348/726
See application file for complete search history.

(56) References Cited

U.S. PATENT DOCUMENTS

| | | | | |
|---|---|---|---|---|
| 4,381,562 | A * | 4/1983 | Acampora | 370/323 |
| 5,191,578 | A * | 3/1993 | Lee | 370/418 |
| 5,680,145 | A * | 10/1997 | Thomson et al. | 343/915 |
| 5,754,942 | A * | 5/1998 | Wachs | 455/9 |
| 5,812,096 | A * | 9/1998 | Tilford | 343/781 R |
| 6,133,964 | A * | 10/2000 | Han | 348/726 |
| 6,278,416 | B1 * | 8/2001 | Harless | 343/915 |
| 6,329,957 | B1 * | 12/2001 | Shea et al. | 343/756 |
| 6,442,148 | B1 * | 8/2002 | Adams et al. | 370/325 |
| 6,480,165 | B1 * | 11/2002 | Moheb et al. | 343/781 R |
| 6,542,132 | B1 * | 4/2003 | Stern | 343/915 |
| 6,798,756 | B1 * | 9/2004 | Kosugi | 370/315 |
| 2002/0160715 | A1 * | 10/2002 | Davis et al. | 455/63 |

FOREIGN PATENT DOCUMENTS

EP 0 849 890 A 6/1998

OTHER PUBLICATIONS

European Search Report for European Patent Application EP 03 00 7494 published Jun. 2, 2004.
Hamidi M. et al.: "TRW's Broadband Communication Payloads at C and Ku Frequency Bands", IEEE vol. 3 3, Mar. 2002, pp. 1247-1255, XP010604255 Redondo Beach, CA *the entire document*.

* cited by examiner

*Primary Examiner*—Lester G. Kincaid
*Assistant Examiner*—Phuoc Doan
(74) *Attorney, Agent, or Firm*—Tarolli, Sundheim, Covell & Tummino L.L.P

(57) ABSTRACT

A satellite system is provided that includes a receive antenna system to receive one of C-band and/or Ku-band signals and a transmit antenna system to transmit one of C-band and/or Ku-band signals. A payload section may be coupled between the receive antenna system and the transmit antenna system. The satellite system may provide broadband communications at C-band and/or Ku-band.

15 Claims, 8 Drawing Sheets

BROADBAND COMMUNICATION SATELLITE

BACKGROUND OF THE INVENTION

1. Field of the Invention

The present invention relates to communication satellites. More particularly, the present invention relates to communication satellites that operate in the C-band and the Ku-band.

2. Discussion of the Related Art

Conventionally, communication satellites were confined to telephone communications. However, many forms of communication are now being relayed by geo-synchronous satellites including, but not limited to, voice, data, video, television, and radio. Several major industries are heavily dependent upon reliable satellite communications service being continuously available.

FIG. 1 is an illustration of a satellite communications network in which two satellites provide redundancy for communications. Satellites 10 and 20 communicate with ground stations 30 located within a region of Earth 40 using a uniform distribution methodology. This uniform distribution methodology allows for communications to an entire region of Earth 40, such as, but not limited to, North America. If one of the satellites 10 or 20 should ever fail, then the other satellite may take over its communications function. However, this redundancy is expensive to implement since two satellites must be used in case one fails. Further, should demand increase in one location, it may not be possible to reconfigure the satellites in orbit to handle the additional load from the increased traffic seen in one area.

One mechanism utilized to overcome the foregoing problems of redundancy and capacity has been to utilize multiple feeds to form multiple spot beams to target specific locations on Earth 40. Conventionally, only a relatively small number of feeds could be placed within a single antenna due to the large feed horn size. However, as illustrated in U.S. Pat. Nos. 6,211,835, 6,215,452 and 6,236,375, the subject matter of which are hereby incorporated by reference in their entirety, it is now possible to have a large number of spot beams in which each spot beam individually targets specific locations on Earth 40 using hemispherical earth coverage antennas.

FIG. 2 is an example illustration of spot beams positioned over predefined Earth locations utilizing hemispherical earth coverage antennas. A satellite positions its spot beams 50 to cover South America and the east coast of the United States from its location at 45 degrees west longitude. More than one spot beam may be directed at any given location within the range of the satellite. Further, the positioning of the spot beams is dependent upon the physical alignment of the feeds in the antenna of the satellite and the longitude at which the satellite is positioned in geo-synchronous orbit as detailed in U.S. Pat. Nos. 6,211,835; 6,215,452; and 6,236,375. The spot beams may be directed towards those areas where demand is highest and profitability maximized. Therefore, the positioning of feeds to generate spot beams may be critical in determining the profitability and redundancy of a satellite communications network.

BRIEF SUMMARY OF THE INVENTION

Embodiments of the present invention may provide a satellite system that includes a receive antenna system to receive C-band and/or Ku-band signals and a transmit antenna system to transmit C-band and/or Ku-band signals.

A payload section may be coupled between the receive antenna system and the transmit antenna system.

The receive antenna system may receive C-band signals at approximately 5.9 to 6.4 GHz and the transmit antenna system may transmit C-band signals at approximately 3.7 to 4.2 GHz.

The transmit antenna system may receive Ku-band signals at approximately 14.0 to 14.5 GHz and the transmit antenna system may transmit Ku-band signals at approximately 11.2 to 12.2 GHz.

The transmit antenna system may provide multibeam coverage and shaped area coverage.

Each of the receive antenna system and the transmit antenna system may include a mesh reflector design type that includes a first net, a second net and a truss.

The payload system may include a digital transponder that provides circuit-switch communication between the receive antenna system and the transmit antenna system.

The payload system may also include a full on-board processing device that includes a demodulator section and a router section. The demodulator section outputs data packets to the router section based on received signals.

Other embodiments, objects, advantages and salient features of the invention will become apparent from the following detailed description taken in conjunction with the annexed drawings, which disclose preferred embodiments of the present invention.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto.

The following represents brief descriptions of the drawings in which like reference numerals represent like elements and wherein.

DETAILED DESCRIPTION OF INVENTION

Figure 1:
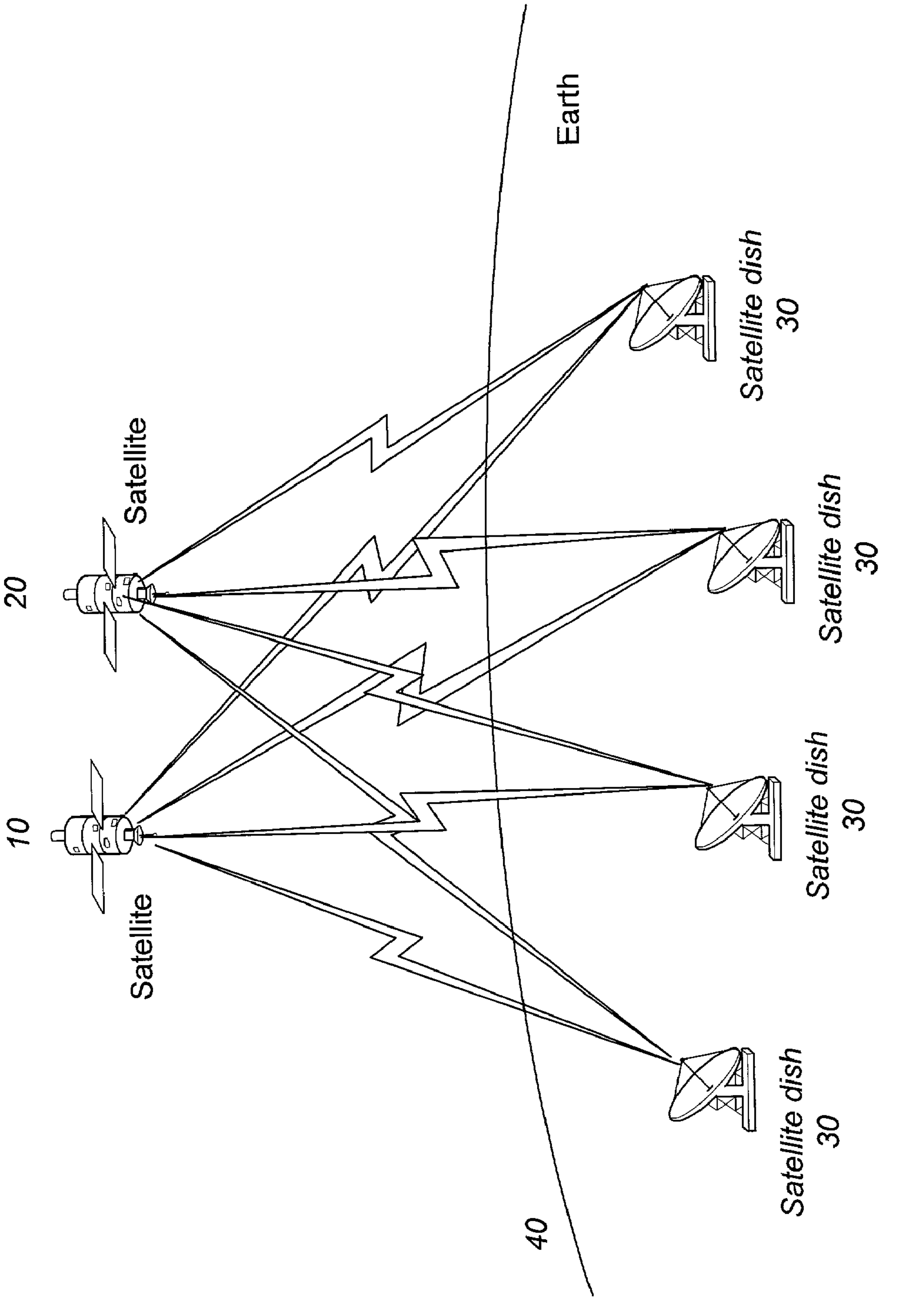
FIG. 1 illustrates a satellite communications network.
Figure 2:
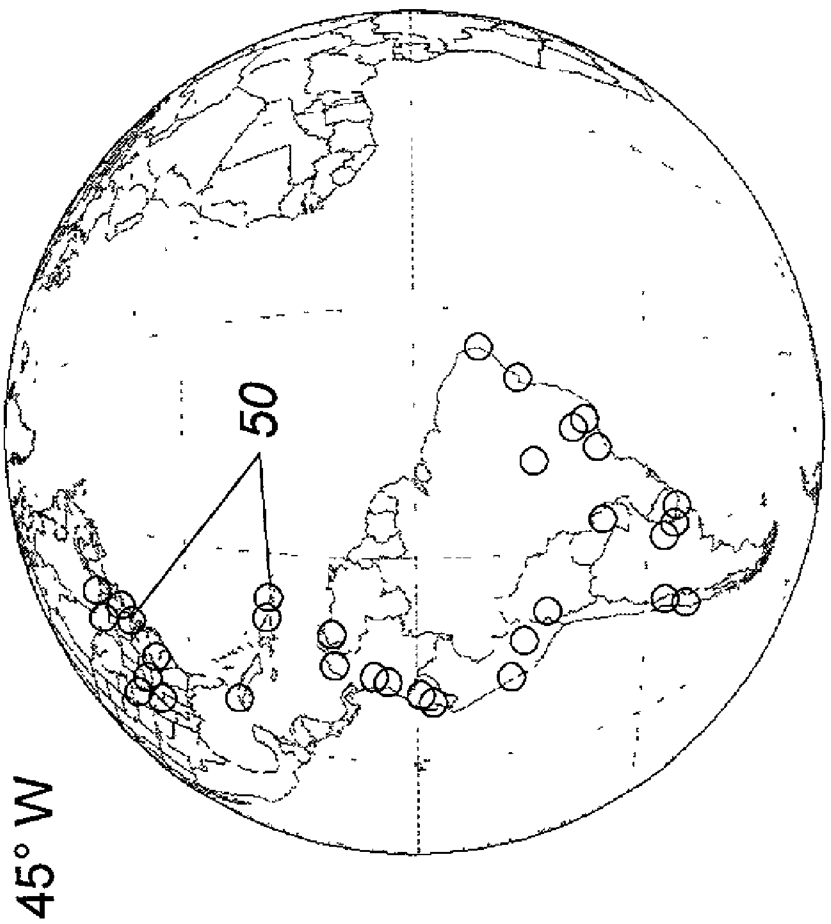
FIG. 2 illustrates spot beams positioned over Earth.

In the following detailed description, like reference numerals and characters may be used to designate identical, corresponding, or similar components in differing drawing figures. Furthermore, in the detailed description to follow, example values may be given, although the present invention is not limited thereto. Well-known power connections and other well-known elements have not been shown within the drawing figures for simplicity of illustration and discussion and so as not to obscure the invention.

Embodiments of the present invention relate to broadband communication satellites (or satellite systems) that operate in C-band and/or Ku-band. Ku-band is the portion of the electromagnetic spectrum approximately in the 11 GHz to 14 GHz range. In Ku-band, the signals may be approximately 14 GHz on the uplink and approximately 11 GHz on the downlink. C-band is the portion of the electromagnetic spectrum approximately in the 4 GHz to 6 GHz range. In the C-band, the signals may be approximately 6 GHz on the uplink and approximately 4 GHz on the downlink. Embodiments of the present invention will be described with respect to deployable shaped beam reflectors that provide 2 to 3 dB improvement over solid surface shaped beam reflectors. This may reduce the payload power and size requirements for similar performance. The shaped mesh reflectors allow more communication capacity at the same power.

Before describing embodiments of the present invention, a brief discussion will be provided of C and Ku technology. Satellite communication systems may operate in C and Ku frequency bands. The constraint on the size of the antenna reflectors, and the satellite mass and power limitations may impose some common characteristics on C/Ku-band systems. Satellites have few beams, each usually greater than a few degrees, with broad regional or hemispheric coverage areas. The beams are more or less tailored for coverage of the intended audience. EIRPs may be in the range of 30–40 dBWi for C-band and 40–50 dBWi for Ku-band systems. Further, radio frequency (RF) power amplification may be provided by large (=100W) traveling wave tube amplifiers (TWTA). Transponders may also have, for example, a 36-MHz bandwidth. Additionally bandwidths such as 27–, 54–, and 72–MHz bandwidths may also be used. A few dozen transponders may also be provided per band per polarization on-board. Both linear and circular polarizations may also be used.

Broadcasting is a major mode of operation of C-band and Ku-band systems, especially for applications requiring comparatively higher data rates such as video transmission. Some two-way services are offered, but generally, only the forward links pass through the satellite. The return link is through ground networks. Trunking of data (telephone, internet, etc.) is another major application for C-band and Ku-band systems. It is desirable to provide C/Ku communication systems for new services at reasonable costs. Hence, communication payloads are needed that can support higher data rates and capacity at the satellite mass and power capability. Beside the path of increasing power efficiencies and lowering power losses, this may be accomplished by shaped area coverage using large deployable reflectors and multibeam coverage as will be described.

Wide area coverage may suffer from two types of RF power wastage. First, a good percentage of the power may be lost on unpopulated areas such as oceans and deserts. Second, the power of the beams may decrease very slowly at the edge of the area of coverage and a considerable amount of energy may be lost in this gradual decrease. These phenomena are caused by the relatively small size of solid antenna reflectors. The size constraint of launch vehicles and packaging concerns may limit the solid reflector diameters to the 2–3 m range, for example.

In accordance with embodiments of the present invention, lightweight, shaped beam, deployable reflectors may be provided with diameters ranging from 6 m to 30 m, for example. Other diameters are also within the scope of the present invention. These reflectors may provide shaped area coverage. For comparable stowed volume these reflectors may provide 2–3 dB (60–100%) improvement in shaped directivity over their solid counterparts. This improvement may be due to the relative flattening of the radiation pattern over the area of coverage and to its rapid decrease at the edges of the area.

The improvement in gain may lead to a comparable increase in the satellite communication capacity allowing higher data rates and throughputs. Alternatively, the higher gain may reduce the system cost. The higher gain may imply a lower RF power requirement to provide the same level of service, which leads to lower power demand on the satellite (i.e., smaller solar arrays and batteries, consequently lower thermal power losses, less complexity in the thermal control system and small thermal radiating areas). This may result, in turn, in lower satellite size, mass, and complexity, i.e., lower satellite production cost on one hand and the possibility of launch by small more cost efficient launch vehicles on the other hand. The two alternatives may also be combined into a system with higher capacity and lower cost than current systems.

Multibeam coverage was originally developed for use in Ka- and V-band systems where, because of the high frequency of the carrier wave, the antenna radiation patterns are narrow. The coverage area is tiled by small, independent beams. The frequency band allocated to the system is divided into several sub-bands. Each two adjacent beams may use two different sub-bands, or polarizations, to avoid interference. The number of sub-bands may be chosen such that the interference between the two nearest beams using the same color is negligible. This may be achieved by designing the antenna such that the ratio of the carrier power to the interfering power (C/I) is higher than a given threshold. Multibeam systems have two big advantages, namely higher capacity and flexibility of coverage.

The higher capacity will first be described as one advantage of multibeam coverage. If B represents the bandwidth allocated to a system, then a C-band and a Ku-band system may each have B=500 MHz. If 2 polarizations are used, then the bandwidth available for each wide beam will be 2B. If the same area is covered by N beams with S sub-bands, then each beam may have a bandwidth of B/S, but the total bandwidth of the system will be 2N times B/S, since there are N independent beams and two polarizations. System capacity is effectively multiplied by N/S. As one example, for 48 beams and four sub-bands, the capacity may increase by a factor of 12. Thus, the system may have an equivalent bandwidth of 12 GHz. These multibeam systems may require the capability of producing narrow beams with low sidelobes to get high C/I levels. In accordance with an example embodiment of the present invention, one way of providing these beams is to use large, deployable antenna reflectors.

The coverage flexibility will now be described as another advantage of multibeam coverage. Wide area coverage inherently wastes RF power. For example, in an area such as Western Europe there is wide area coverage. Television broadcast in any language may only be usable in one or two countries and wasted elsewhere. This wastage becomes even more pronounced in point-to-point communications or point-to-multi-point communications. Multibeam coverage, because of the relatively small area served by each beam, may adapt coverage to specific geographic areas. This adaptation may allow the systems to direct the RF power only to where it is used (i.e., can generate revenue) and enable local content delivery in broadcasting. Moreover, multibeam coverage may permit alignment with some geo-political concerns such as reducing frequency coordination problems between neighboring countries and preventing broadcasting unwanted content to areas where such content is not acceptable.

Figure 3:
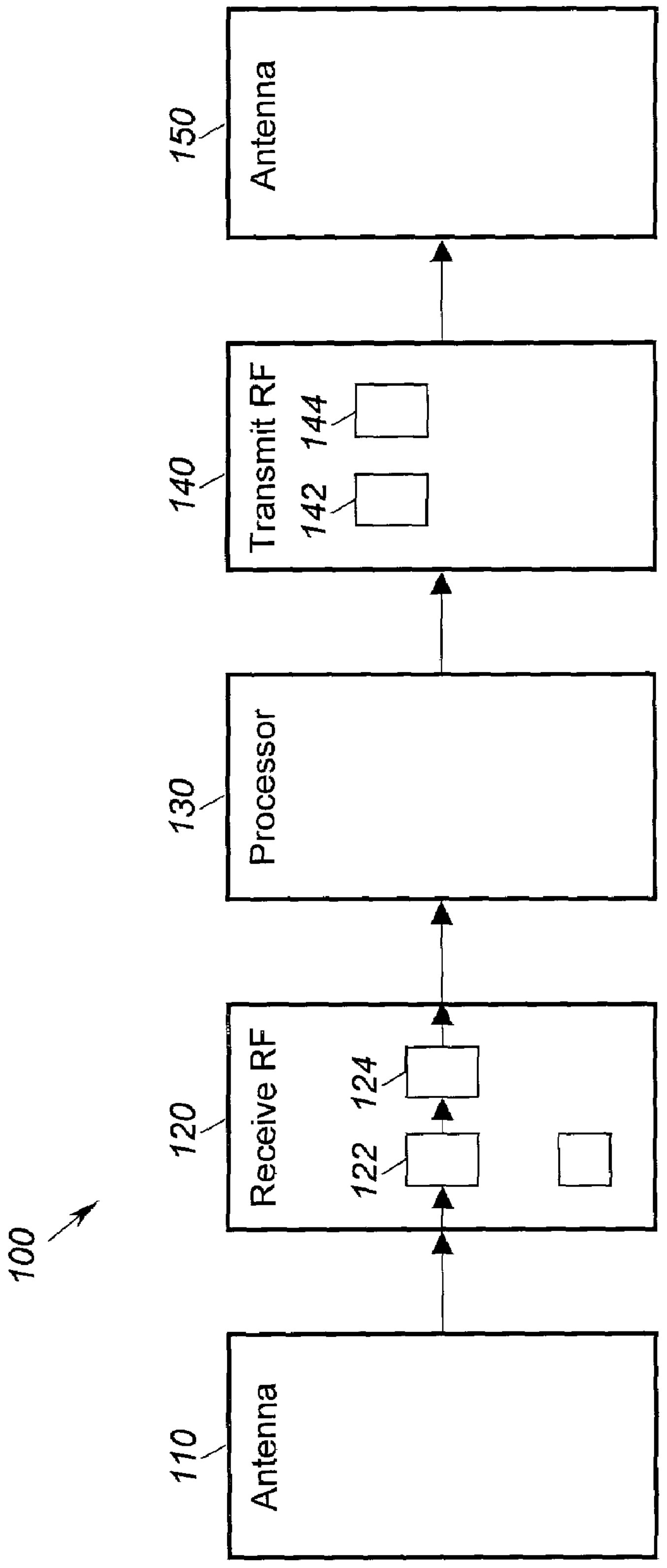
FIG. 3 illustrates a broadband satellite according to an example embodiment of the present invention.

FIG. 3 illustrates a communications satellite 100 according to an example embodiment of the present invention. Other embodiments and configurations are also within the scope of the present invention. As shown, the satellite 100 may include three subsystems, namely an antenna subsystem, an RF subsystem, and a processor subsystem. More specifically, uplinked signals may be received by antennas 110. The signals may be downconverted to an intermediate frequency (IF) by a receive RF system 120. These IF signals may be processed by a processor system 130 and are upconverted to the transmit frequency by a transmit RF system 140 before being downlinked through antennas 150.

As shown, the receive RF system 120 may include a plurality of LNA/downconverters 122 coupled to a plurality of downconverters 124. The receive RF system 120 may also include a frequency generator 126 to generate a low frequency signal. The transmit RF system 140 may include a plurality of upconverters 142 and a plurality of EPC/TWTA's 144. Each of the antenna subsystem, the RF subsystem and the processor subsystem will now be briefly described.

Figure 4:
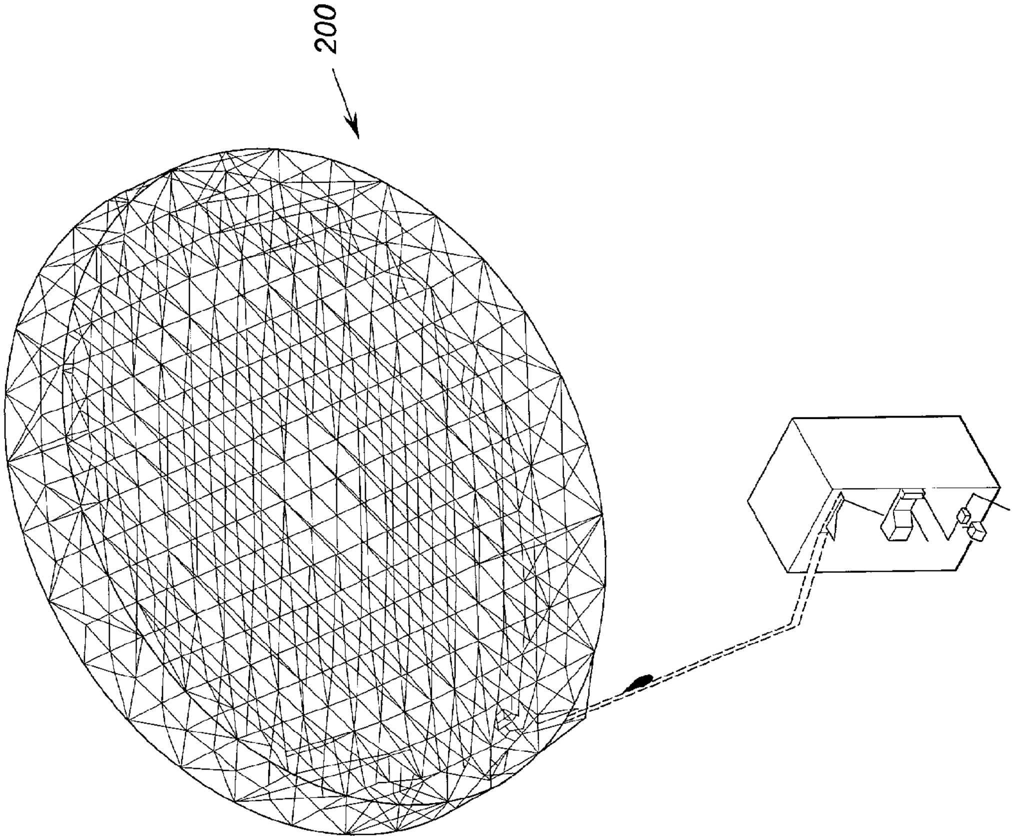
FIG. 4 illustrates a deployable reflector design according to an example embodiment of the present invention.

The antenna subsystem will first be described. FIG. 4 illustrates a deployable antenna reflector 200 according to an example embodiment of the present invention. Other embodiments and configurations are also within the scope of the present invention. The large deployable antenna reflector 200 allows tight shaped area coverage and multibeam coverage. The manufacturing process may provide parabolic or shaped beam mesh reflectors of diameters of 30 m, for example. Mesh reflectors having diameters greater than 25 m may be provided for space application. The surface distortion tolerances may be sufficient for higher frequencies up to the Ku-band.

Figure 5:
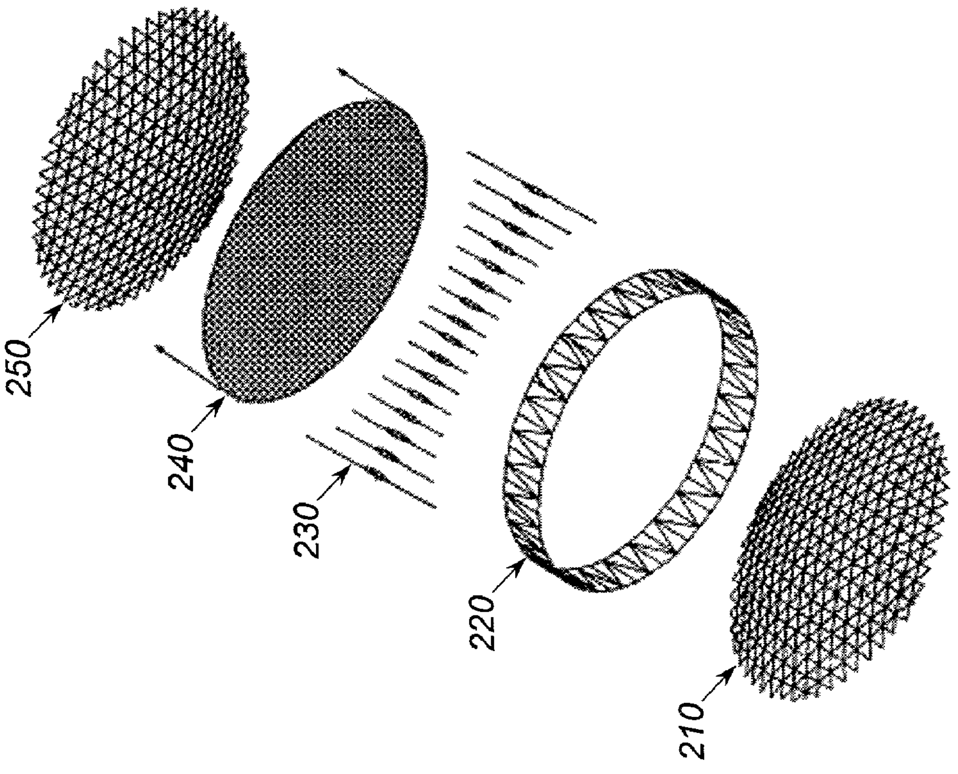
FIG. 5 illustrates components of the reflector design of FIG. 4 according to an example embodiment of the present invention.

FIG. 5 illustrates components of the antenna reflector type 200 shown in FIG. 4. Other embodiments and configurations are also within the scope of the present invention. As shown, the antenna reflector 200 may include a rear net 210, a truss 220, tension ties 230, mesh 240 and a front net 250. More specifically, the antenna reflector 200 may include a pair of doubly curved geodesic trusses, (called nets) that are placed back-to-back in tension across the rims of a deployable graphite-epoxy ring truss (shown as the truss 220). This drum-like structure may have exceptional structure efficiency, thermal dimensional stability, and stiffness-to-weight ratios. The structure may be light and inherently stiff so as to be able to precisely and repeatedly deploy the reflective mesh 240 regardless of environment. The reflector may be compactly stowed. Fully stowed, the truss package may be a narrow, hollow cylinder with deployable truss members adjacent to each other. The end-most members (i.e., the rear net 210 and the front net 250) may be preloaded against lightweight hoops that act as stiffening and debris-shielding end-caps for the stowed package. This may form a barrel-like structure that is strapped into lightweight cradles for launch. Certain members in the package may be over-stowed so that the truss 220 gently expands or "blooms" when the ties 230 are released.

The RF subsystem will now be briefly described. Low noise amplifiers (LNA), downconverters (D/C) and upconverters (U/C) may be produced in extremely small MMIC (millimeter/microwave integrated circuit) packages using gallium arsenide (GaAs) or indium phosphide (InP) technology. Because of their small size, the LNA/downconverters (shown in block 122 of FIG. 3) may be mounted directly on the antenna feed horns. The received signals may be converted to a relatively low IF immediately at the feed and brought to the RF subsystem by a coaxial cable. This improves over systems in which rigid metallic waveguides bring the received signals to the RF subsystem where it goes through the LNA and downconversion. The ability to collocate this first stage of processing with the antenna feed may eliminate the waveguides and prevent the loss of received power in the waveguides, reduce the payload mass and simplify payload integration. Similarly, for the downlink side, the upconverters (shown in block 142 of FIG. 3) may be mounted directly on the TWTAs.

The processor subsystem will now be described. The processor subsystem may classify the payload into two types: (1) transponders; and (2) payloads with full on-board processing (OBP). Both types of payloads may support multibeam capabilities with frequency reuse, and shaped beam coverage.

In transponders, a signal from a user in one spot beam may be transmitted bent-pipe to another user or a gateway. The payload may establish a circuit between two users or a user and a gateway without processing the actual transmitted signal (other than frequency conversion and amplification). Transponders may be easier and less costly to build than OBP payloads.

In full OBP payloads, the incoming signals may be formed into packets and the payload may act as a packet switch directing each packet to its destination. The payload may interpret the data and discard empty packets to provide a more efficient downlink bandwidth. Furthermore, the payload may enhance throughput by optimization of bursty traffic through statistical multiplexing, and by dynamic reallocation of bandwidth. One advantage of full OBP payload is improvement of link performance through processing and conditioning of the received uplink signals.

Figure 6:
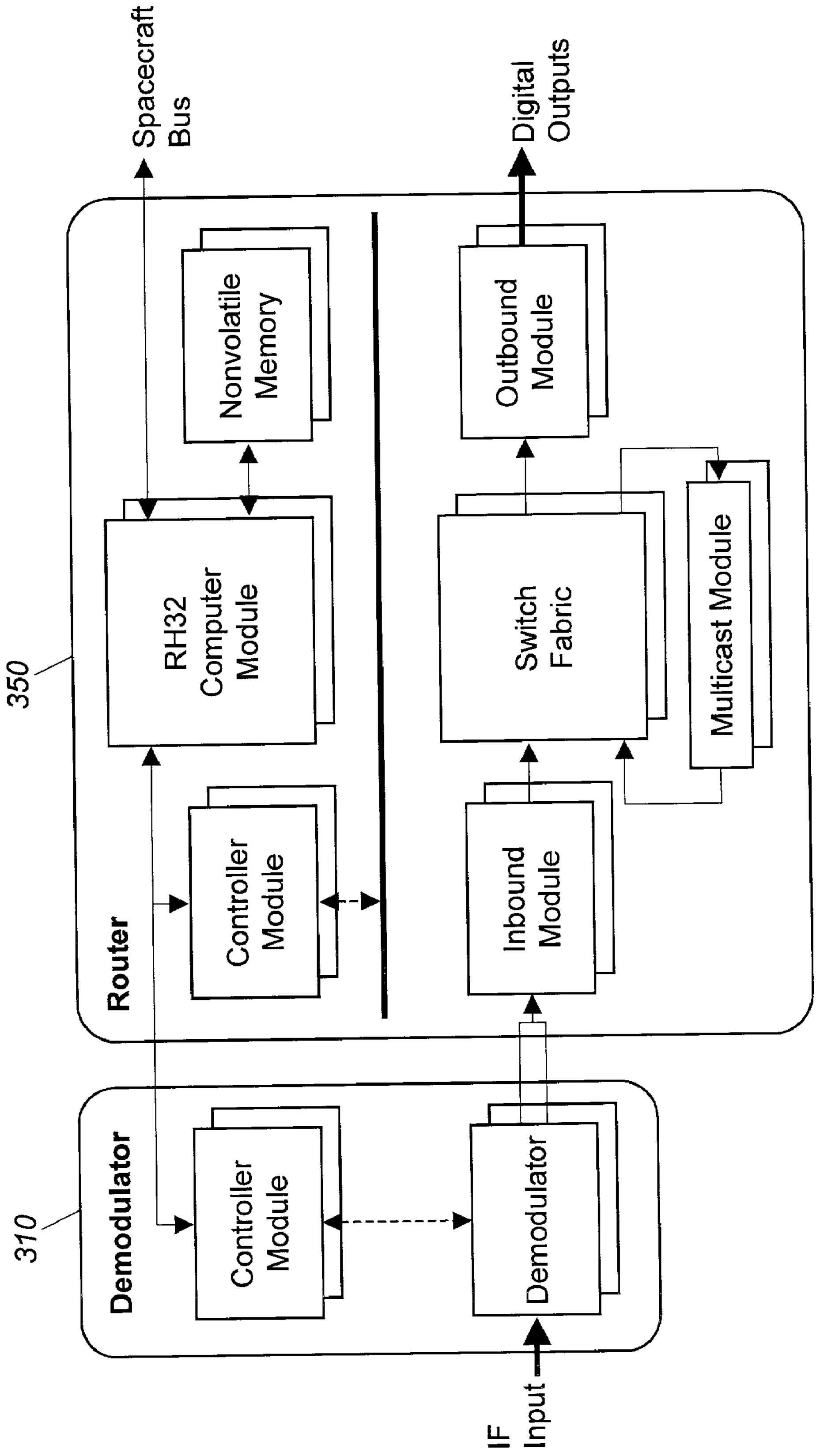
FIG. 6 illustrates a payload of a broadband communication satellite according to an example embodiment of the present invention.

FIG. 6 shows the payload of a broadband communications satellite having full on-board processing according to an example embodiment of the present invention. Other embodiments and configurations are also within the scope of the present invention. As shown, the processor subsystem may include a demodulator section 310 and a router section 350. The demodulator section 310 may include a plurality of demodulators and a controller module. The demodulators may convert the received signals to digital form. The digital samples may be processed via channelization algorithms to select the three different channel types. These algorithms may operate at less than half the power of typical FFT (fast Fourier transform) algorithms. Each channel may be demodulated and decoded. Functionally the equivalent of well over 10,000 demodulators and decoders may occur on board, for example. The demodulator section 310 may output the data formatted into packets to the router section 350. The router section 350 may include a packet switch and an on-board computer for control. More specifically, the router section 350 may include inbound modules, multicast modules and outbound modules coupled via a switch fabric. The signals may be input to the router section 350 via the inbound modules and are output from the outbound module of the router section 350 as digital outputs. Switch-scheduling algorithms may maximize use of the downlink channels with minimal weight and power. Switch outputs may be formatted and encoded for transmission, then modulated with offset QPSK square-root-raised cosine pulses.

The processor subsystem may be produced into a backplane architecture with plug-in cards making the design inherently modular and scaleable. Multicast capability may be increased by installing additional multicast plug-in modules. The payload processor may be configured to process additional beams by adding additional demodulator and router plug-ins.

On-orbit system flexibility may be achieved via programmable flight controllers and configurable processor functions allowing some payload functions to be adaptable over time. Software-based functions and configurable hardware may allow the payload to be optimized for changes in traffic patterns over the life of the satellite. Software-based functions may allow for continuous improvements in satellite management. Examples include security algorithms, fault management processing, and congestion control processing. For rapid fault detection and isolation, the software may check critical payload functions continuously.

Figure 7:
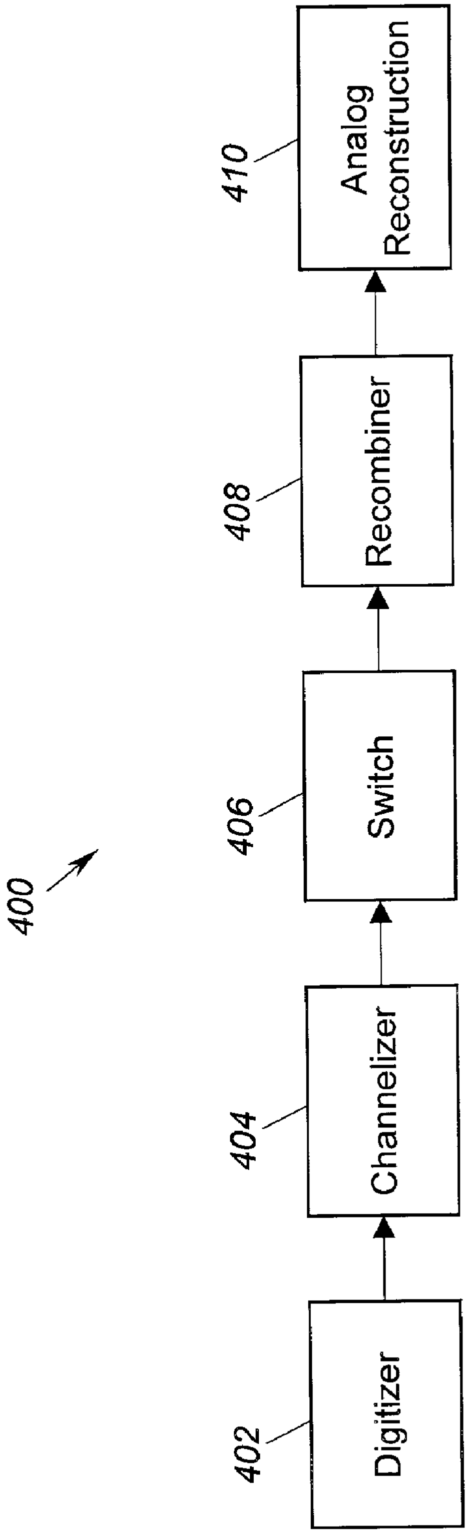
FIG. 7 illustrates a payload of the broadband communication satellite according to an example embodiment of the present invention.
Figure 8:
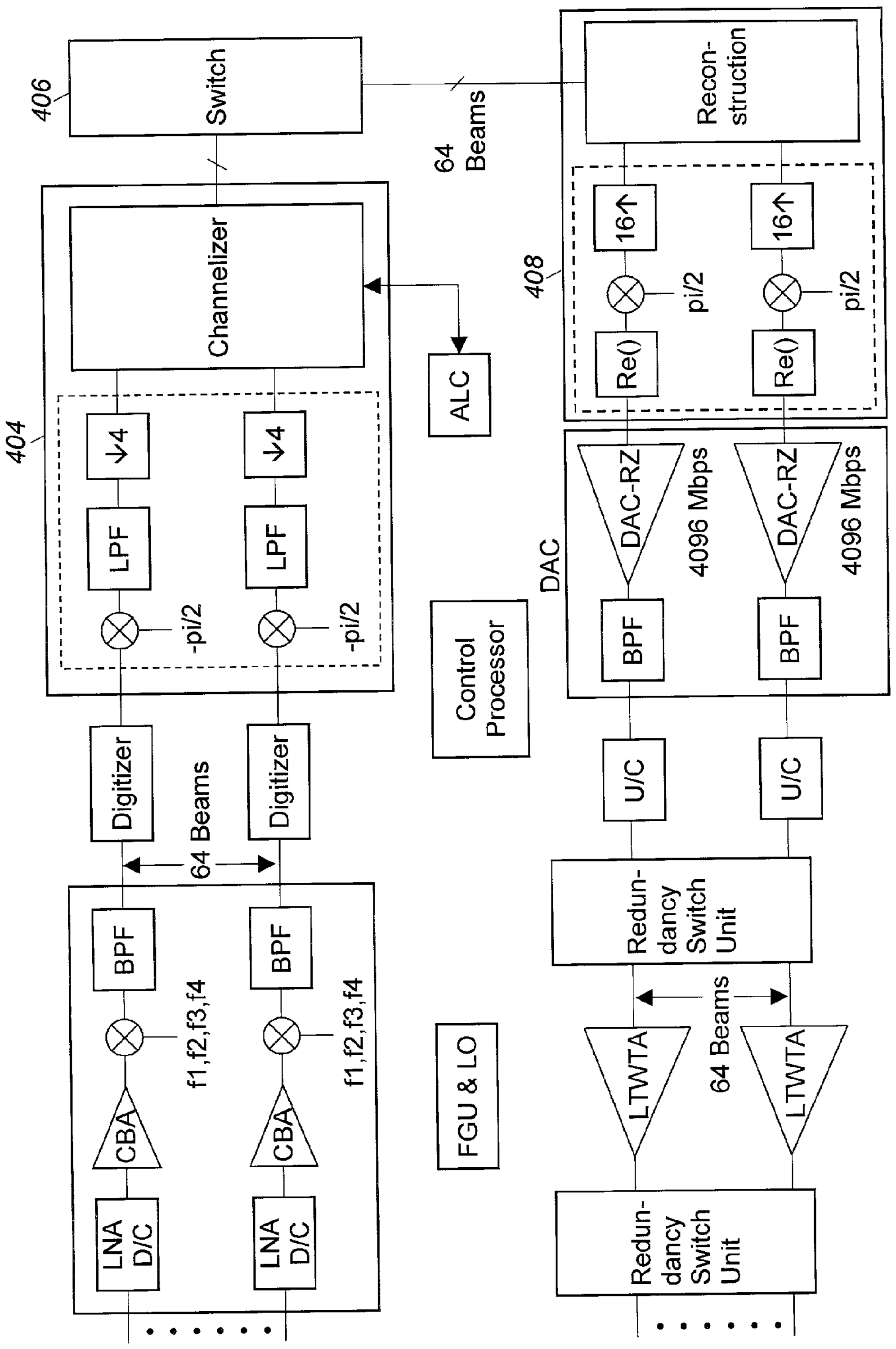
FIG. 8 illustrates a payload of the broadband communication satellite according to an example embodiment of the present invention.

FIG. 7 is a block diagram of a digital transponder 400 according to an example embodiment of the present invention. FIG. 8 is a more detailed diagram of a digital transponder 400 according to an example embodiment of the present invention. Other embodiments and configurations are also within the scope of the present invention. The digital transponder 400 may establish circuit-switched communication between any two spot beams or within the same beam and may be backward compatible with analog transponders operating at (selectable/programmable) frequencies such as 27, 36, 54, 72 MHz. The digital transponder 400 may provide reconfigurable connectivity at subtransponder level to allow adaptability to changing markets and traffic pattern. The digital transponder 400 may allow allocating and selling bandwidths at fractional transponder levels: E1, T1, etc. and deliver improved amplitude and phase linearity through digital pre-distortion of the high power amplifiers. Additionally, a digital transponder may be designed to implement any bandwidth channelization built up using smaller bandwidth increments. For example, a 10 MHz channel may be built up from 20 500 KHz bandwidth channels. The digital transponder 400 may also offer increased capacity through more efficient modulation such as 8-PSK and 16-QAM as well as by reducing necessary channel guard bands.

The digital transponder 400 may include five modules, namely a digitizer module 402, a channelizer module 404, a switch module 406, a recombiner module 408, and an analog reconstruction module 410 (or a digital-to-analog (DAC) converter). The uplinked signals may be downconverted at the antenna and input to the digitizer module 402. The channelizer module 404 may divide the baseband input signal, containing the user channels, into 250 0.5-MHz sub-channels, for example. An automatic level control function (ALC) may normalize the average power of the signal received from each user to a constant level. This control may help increase the efficiency on the downlink. The recombiner module 408 may perform the inverse function of the channelizer module 404. The recombiner module 408 may combine the 250 sub-channels into 125 MHz bandwidth channels, for example. Reconstruction filter design constraints may ensure minimal signal distortion during this process. The switch module 406, commanded by a control processor, may route sub-channels data from the channelizer module 404 to the appropriate ports in the recombiner module 408. The switch module 406 may be reconfigurable in less than a microsecond and support both point-to-point, multicast and broadcast operations. Switch reconfiguration may be programmed by ground command. High-speed, indium phosphide, integrated circuit devices may convert the digital output of the recombiner module 408 to 125 MHz analog beams for downlink. The DAC chips (forming the analog reconstruction module 410) may have a data rate that is more than the required amount. The additional rate may be used to implement a return-to-zero operation that flattens the output spectrum of the conversation and eliminates the need for complicated output compensation measures such as "sinx/x" compensation.

Embodiments of the present invention have been described with respect to broadband communication satellites that operate for the C-band and the Ku-band. These multibeam systems may increase system capacity through frequency reuse. The power efficiency may be increased through dedicated coverage of revenue producing areas. The systems may have a high EIRP such as 50 dBWi to 60 dBWi per transponder. Additionally, higher data rates such as 10 kbps to 120 Mbps may be achieved. Various network configurations such as mesh, star or hybrid may be provided. Still further, smaller earth terminals such as 1.8 m to 6 m may be used to receive the signal from the satellite.

Any reference in the above description to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the knowledge of one skilled in the art to effect such feature, structure, or characteristic in connection with other ones of the embodiments.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A satellite system comprising:

a receive antenna system to receive one of C-band and Ku-band signals;

a transmit antenna system to transmit one of C-band and Ku-band signals; and a payload section coupled between said receive antenna system and said transmit antenna system and comprising a digital transponder operative to route digital sub-channels from the receive antenna system to the transmit antenna system, the digital transponder comprising a channelizer module operative to divide a plurality of user channels of a baseband input signal into about 250 sub-channels, each sub-channel comprising a bandwidth of about 0.5 MHz, and a recombiner module operative to combine the sub-channels into a plurality of downlink output channels, each downlink output channel comprising a bandwidth of about 125 MHz.

2. The satellite system of claim 1, wherein said receive antenna system receives C-band signals at approximately 6 GHz and said transmit antenna system transmits C-band signals at approximately 4 GHz.

3. The satellite system of claim 1, wherein said receive antenna system receives Ku-band signals at approximately 14 GHz and said transmit antenna system transmits Ku-band signals at approximately 11 GHz.

4. The satellite system of claim 1, wherein said transmit antenna system provides at least one of multibeam coverage and shaped area coverage.

5. The satellite system of claim 1, wherein each of said receive antenna system and said transmit antenna system comprises deployable mesh reflectors, which range in diameter from about 6 meters to about 30 meters and are operative to provide at least one of multibeam coverage and shaped area coverage.

6. The satellite system of claim 5, wherein each mesh reflector comprises a pair of doubly curved geodesic nets arranged back to back in tension across the rims of a deployable graphite-epoxy ring truss.

7. The satellite system of claim 1, wherein said digital transponder provides circuit-switch communication between said receive antenna system and said transmit antenna system.

8. The satellite system of claim 1, wherein the sub-channels are routed by a switch module configurable to support point-to-point, multicast, and broadcast communications operations.

9. A method of communication by satellite comprising:

transmitting signals to receive antennas on a satellite, said signals being at one of C-band frequencies and Ku-band frequencies;

routing digital sub-channels corresponding to said received signals from said receive antennas to transmit antennas via a digital transponder payload, dividing a plurality of user channels of a baseband input signal via a channelizer module into about 250 sub-channels, each sub-channel comprising a bandwidth of about 0.5 MHz, combining the sub-channels into a plurality of downlink output channels via a recombiner module, each downlink output channel comprising a bandwidth of about 125 MHz; and transmitting signals at one of C-band frequencies and Ku-band frequencies from said transmit antennas.

10. The method of claim 9, wherein said transmit antenna system provides at least one of multibeam coverage and shaped area coverage.

11. The method of claim 9, wherein said transmitted beams provide shaped area coverage.

12. The method of claim 9, wherein each of said receive antennas and said transmit antennas comprise deployable mesh reflectors, which range in diameter from about 6 meters to about 30 meters and are operative to provide at least one of multibeam coverage and shaped area coverage.

13. The method of claim 12, wherein each mesh reflector comprises a pair of doubly curved geodesic nets arranged back to back in tension across the rims of a deployable graphite-epoxy ring truss.

14. The method of claim 9, wherein said digital transponder provides circuit-switch communication between said receive antennas and said transmit antennas.

15. The method of claim 9, wherein routing digital sub-channels further comprises configuring a switch module for point-to-point, multicast, and broadcast communications operations.

* * * * *